Jan. 31, 1967
G. W. STANWICK
3,301,299
INTERFERING THREAD FORM
Filed May 27, 1965
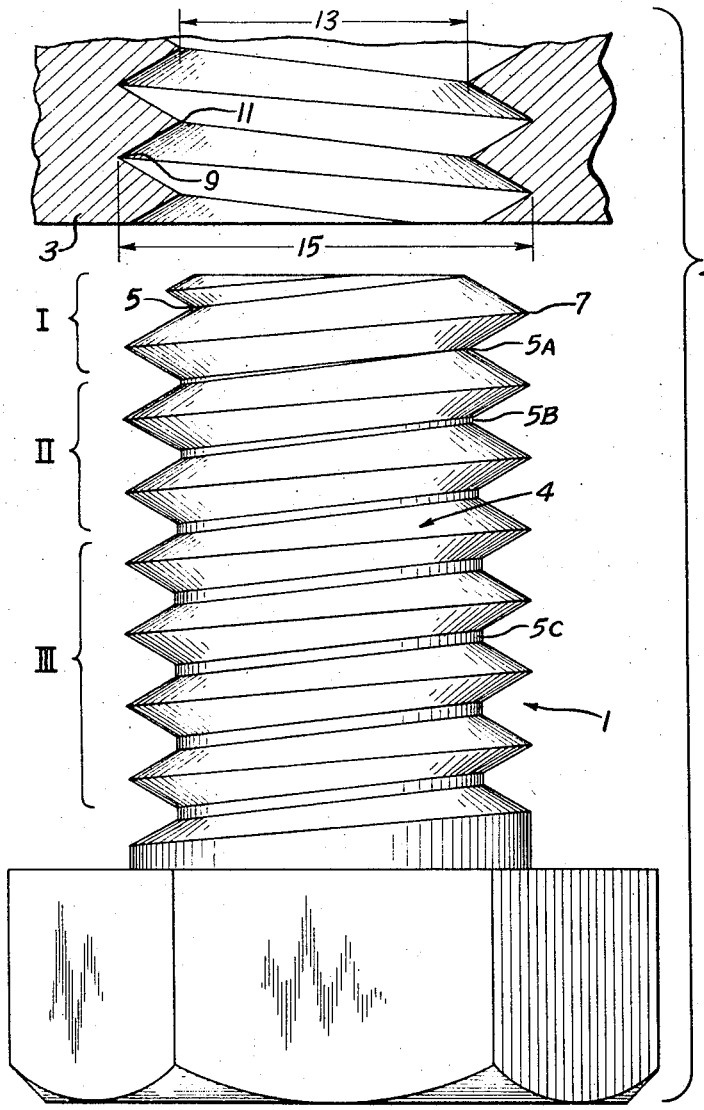
Fig. 1.
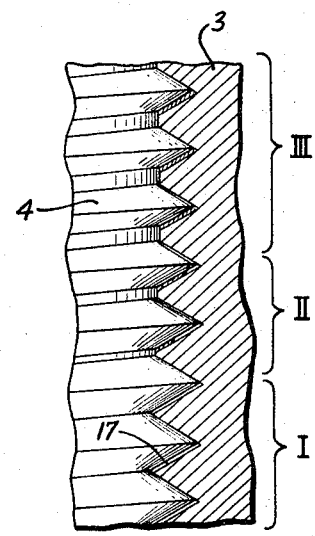
Fig. 2.
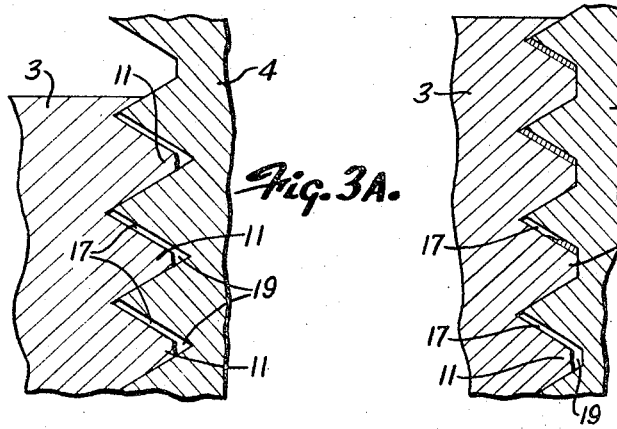
Fig. 3A.
Fig. 3B.
INVENTOR.
GLENN W. STANWICK
BY
Lieber & Nilles
ATTORNEYS United States Patent Office 3,301,299
Patented Jan. 31, 1967

3,301,299
INTERFERING THREAD FORM
Glenn W. Stanwick, Brookfield, Wis., assignor to Accurate Automatic Parts, Inc., Brookfield, Wis., a corporation of Wisconsin
Filed May 27, 1965, Ser. No. 459,404
4 Claims. (Cl. 151—22)

This application is a continuation-in-part of my copending U.S. patent application No. 111,333, filed May 19, 1961, which is now abandoned.

This invention relates to an interfering thread form which provides an extremely close tolerance post assembly fit between a male member to which it is applied and the female member or receiver. The close tolerance fit thereby provided resists removal of the male member from the female member. By way of example, such a thread form may find application in a fastener or stud for components subjected to vibration, such as automotive, aircraft, or marine propulsion engines.

In the prior art, close tolerance fits for threaded members have been obtained by precision machining or grinding of the members. Federal Handbook No. H-28, as revised in 1957, establishes five classes of differing tolerances for such members. Obtaining the tolerances required by all but the two lowest of these classes by denomination has necessitated expensive machining by the above methods. Additionally, the inability of these methods to consistently produce threaded members of the desired tolerances, also greatly adds to the cost of manufacture because of excessive scrappage or waste of materials.

In uniting machine parts, such as propulsion engines wherein the structure is subjected to considerable vibration, it is frequently necessary to provide some resistance to removal or locking to the threaded fasteners used in such structures. In some cases, special lock nuts or lock washers can be used, but in many instances, the use of these separate locking devices is either impossible or impractical. Attempts have accordingly heretofore been made to incorporate locking means directly in the thread form of either the male or female member or both, but to date, these attempts have not proven entirely satisfactory for one reason or another. For example, many of such thread forms have required special thread forming which is not possible with standard thread rolling and cutting machines. Often these special thread forms must be machined to close tolerances to function properly. Others of such thread forms tear or mutilate either or both the male and female members.

The present invention, therefore, provides an interfering thread form which obtains a close tolerance fit between threaded members without the need of precision forming of either of the members prior to assembly.

The present invention further provides an interfering thread form which obtains a high degree of resistance to removal or locking between a member to which it is applied and a mating member and is relatively unaffected by prolonged engine vibration or the like as distinguished from the case of devices utilizing separate locking means.

The interfering thread form of the present member may be applied to a male member with standard thread machining equipment and the resulting member may be used in conjunction with female members having standard threads.

The above and other advantages of the invention are obtained by providing an interfering male thread form comprised of three distinct axial zones throughout its length. The first zone extends through at least one complete convolution of th eroot of the thread form and contains roots and crests of ordinary dimensions and tolerances. The first zone serves to engage the threads and permit driving of the male into the female member without stripping. The second zone includes convolutions of the root subsequent to the first zone which are flattened to a progressively increasing diameter to form an interference fit of considerable magnitude with the crests of the female member or receiver, thereby to cold work the threads of the female member to a close tolerance fit. The amount of this interference must be closely controlled, as hereinafter described, to achieve the features of this invention. The length of the second zone is likewise subject to definite limitations and must be extended through at least one complete convolution. The third zone of the thread form comprises the convolutions of the root subsequent to the second zone. The root diameter in this zone is of the same constant diameter corresponding to the increased diameter of the root at the termination of the second zone. The threads in this zone absorb the loads applied to the male member and resist its removal from the female member.

The invention, together with its features and advanages, may more fully be appreciated by reference to the following specification, and drawings forming a part thereof, in which:

FIG. 1 shows an interfering thread form of the present invention in inverted position with respect to the other figure;

FIG. 2 shows a male member having the interfering thread form inserted in a female member or receiver;

FIGS. 3A and 3B are detailed views of the coldworking of the female member by an interfering thread form of the male member.

Referring now to the drawings, FIG. 1 shows an interfering thread form 1 adapted for use with receiver 3. The interfering thread form is shown in use on stud bolt 4, it being understood that it is equally adaptable to other types of fasteners. The stud 4 is formed with root portions 5 and crests 7 while the receiver is formed with roots 9 and crests 11. These crest and root formations may conform to any standard thread form such as Unified, National Fine, National Course, Metric or Whitworth which define the included angle of the roots and crests and other features of the thread form.

Receiver 3 is formed with a uniform axial pitch, uniform crest diameter 13, and uniform root diameter 15. As previously mentioned, the tolerances to which these and the other dimensions from which the receiver threads are formed need be no more than those required by the class of lowest denomination. Generally, for this class of thread form, the tolerances of pitch diameter required are in excess of .005 of an inch. As may be readily understood, this may be readily obtained with a minimum of surveillance of the machining operations.

Thread form 1 of stud 4 is also formed with a uniform axial pitch as defined by one of the previously mentioned standards. The diameter of crests 7 is likewise uniform and within whatever tolerances are desired.

The diameter of root portion 5 of stud 4 varies throughout three distinct zones along the axial length of the stud, indicated by the numerals I, II, and III. Briefly, the root portion 5A in Zone I is of the diameter called for by the specifications of the thread form and class being utilized. The diameter of root 5B in Zone II is progressively increasing throughout the zone. The root 5C in Zone III is of the increased diameter existing at the termination of Zone II. It will be appreciated, that to maintain the proper diameter and included angle of the male thread crests 7, root portions 5B and 5C become flattened upon increasing the root diameter.

Referring now in detail to Zone I, as previously mentioned, the root portion 5A in this zone is uniform in diameter and of the tolerance required by the class to which the receiver is formed. As shown in FIGS. 2 and 3, voids 17 will exist between the stud 4 and receiver 3 due to such tolerances. Additionally, the top portion of crest 7 is usually rounded or truncated by the tapping tool employed to form the threads. This creates an additional void 19 adjacent root portion 5 of stud 4.

The threads of Zone I serve to engage stud 4 and receiver 3 and prevent thread stripping when the former is inserted and driven into the latter. Zone I should be at least one convolution of thread form 1 on stud 4 for satisfactory results. It may, of course, be of a greater number of convolutions if desired.

In Zone II, root portion 5B of stud 4 progressively increases in diameter so as to form a heavy interference with crests 11 of receiver 3 at the termination of the zone. It has been found that an increase beyond the normal truncation tolerances in the diameter of the root portion 5B of thread form 1 of from greater than .004 inch to .008 inch applied through from 1 to 3 convolutions attains the features of the invention without detriment to the other requirements of the thread form. As a general rule, the greater the increase in root diameter, the greater the number of convolutions required.

As shown in FIGS. 2 and 3, the interference between increased diameter root 5B and crests 11 of receiver 3 when within the limits described above cold forms the metal in interference to fill voids 17 and 19 left by previous machining operations. The cold forming causes the portions of the female thread form in interference to flow smoothly and evenly into a shape exactly conforming to that of thread form 1 thereby eliminating the need for close tolerance machining. In addition to increasing the tolerances of the fit between the members and increasing the resistance to separation of the members due to friction and pressure between the members, the above described cold forming process work hardens the contacting surfaces of the members. The extent of this work-hardening depends on the size of the members involved, but may range in depth from .0001 inch up to a potential of .005 inch depending upon the dimensions of Zone II and the rate of insertion.

The number of convolutions forming the second zone must also be closely controlled if the desired coldworking is to occur. If the root diameter of the male form increases through too few a number of convolutions, excessive heat will be generated by the interference between the male and female members. This generation, if carried to its extreme, may cause the male and female members to become welded or fused together. Even if the heat generation is not excessive to this extent, shaving and galling may occur rather than coldforming or the threads will strip or the stud may fracture.

On the other hand, however, if too great a number of convolutions are included in the second zone the overall length of the thread form is increased with a corresponding unnecessary increase in the cost, or failure to meet space requirements, or an undesirable decrease in the length of Zone III which also adversely affects the holding potential. In other words, for a thread form of fixed length, an increase in the number of convolutions in the second zone decreases the number of convolutions available for the first and third zones, thereby interfering with their function. It has been found, therefore, that dimensioning the second zone to include from one to three convolutions depending on the amount of interference attains the features of the present invention.

In Zone III, root 5C is of constant increased diameter similar to that at the termination of Zone II in order to mate with the receiver, cold formed by root 5B. The threads of Zone III resist the load applied to stud 4 and hence must be of a sufficient number of convolutions to provide the required holding action.

By way of example, the interfering thread form of the present invention may be employed over a restricted number of convolutions by making each of the zones, I, II, and III, one complete convolution in length and the increase in the diameter of root 5B in Zone II slightly in excess of .004 inch. Where larger axial distance is available for the thread form, the increase in the diameter of root 5B in Zone II may be extended or .007 to .008 inch and the length of the zone increased to approximately two and one-quarter convolutions. However, to achieve the desired results with respect to cold forming and holding power, the increase in root diameter in the initial convolution in Zone II should be at least .004 inch with the root diameter thereafter being uniformly increased through subsequent convolutions in Zone II to a maximum of .008 inch.

In the employment of the interfering thread form of the present invention, as stud 4 is inserted in FIG. 3, the threads of the studs 4 mate with the threads of receiver 3. This serves to engage stud 4 and receiver 3. As stud 4 is inserted further in receiver 3, the root 5B of progressively increasing diameter in Zone II contacts crests 11 and the coldforming and work hardening process of receiver 3 commences. This coldforming and workhardening process continues as long as root portion 5 is of increasing diameter. As stud 4 is inserted still further in receiver 3, the threads of Zone III occupy the threads of the receiver previously coldformed by root portion 5B to retain stud 4 in receiver 3.

Various modes of carrying out the invention are contemplated as being within the scope of the following claims particularly pointing out and distinctly claiming the subject matter which is regarded as the invention.

I claim:

1. For use in connection with a member having a standard female thread form of uniform axial pitch with roots and crests substantially V-shaped in cross section and having constant uniform diameters; a member provided with a male thread form of corresponding uniform axial pitch throughout and also having crests of constant uniform diameter throughout, said male thread form being receivable in said female thread form and comprised of three axial zones along its length, the first extending through at least the initial complete convolution of the root thereof, said root throughout said first zone being substantially V-shaped in cross section, the second zone including subsequent convolutions of the root, said root being flattened in said second zone to a progressively increasing diameter through between one and three complete convolutions to provide from at least .004 inch interference in the initial convolution to .008 inch interference with the crest of said female thread form in the final convolution of said second zone, and a third zone including the convolutions of the root subsequent to the second zone and having a constant flattened root diameter throughout said third zone corresponding to the diameter of the root at the termination of the second zone, said third zone extending through at least the final complete convolution of the root.

2. A member having the male thread form of claim 1 wherein, the greater the interference between the flattened root portion and the crest of said female thread form at the termination of the second zone, the greater the number of convolutions in the second zone.

3. A member having the male thread form of claim 1 wherein the interference between the flattened root portions and the crest of said female thread form is at least .004 of an inch and said second zone extends through one complete revolution.

4. A member having the male thread form of claim 1 wherein the interference between the flattened root portion and the crest of said female thread form is .007 to .008 of an inch and the second zone extends through 2¼ convolutions.

References Cited by the Examiner

UNITED STATES PATENTS 2,269,476   1/1942   Poupitch _____ 151—14
2,437,638   3/1948   Evans _____ 151—22

CARL W. TOMLIN, *Primary Examiner.*

M. PARSONS, JR., *Assistant Examiner.*